United States Patent
Hirmer et al.

[11] Patent Number: 6,164,799
[45] Date of Patent: Dec. 26, 2000

[54] OPTICS FOR SEPARATION OF HIGH AND LOW INTENSITY LIGHT

[75] Inventors: Gerhard F. Hirmer, Aurora; Robert Passera, Bradford, both of Canada

[73] Assignee: Decoma International Inc., Concord, Canada

[21] Appl. No.: 09/156,330

[22] Filed: Sep. 18, 1998

Related U.S. Application Data

[60] Provisional application No. 60/060,717, Sep. 19, 1997.

[51] Int. Cl.$^7$ ....................................................... F21V 5/02
[52] U.S. Cl. ............................ 362/330; 362/31; 362/327; 362/339
[58] Field of Search ................................ 362/26, 31, 327, 362/330, 339

[56] References Cited

U.S. PATENT DOCUMENTS

| | | | |
|---|---|---|---|
| 5,050,946 | 9/1991 | Hathaway et al. | 362/31 |
| 5,128,842 | 7/1992 | Kenmochi | 362/31 |
| 5,197,792 | 3/1993 | Jiao et al. | 362/31 |
| 5,227,773 | 7/1993 | Wu et al. | 362/31 |
| 5,434,754 | 7/1995 | Li et al. | 362/31 |
| 5,521,796 | 5/1996 | Osakada et al. | 362/330 |

*Primary Examiner*—Alan Cariaso
*Attorney, Agent, or Firm*—Howard & Howard

[57] ABSTRACT

A separation optics structure comprising a transparent unitary body portion extending between a first wide end and a second distal end defines a wedge-shaped structure. The body portion includes a front portion defining a generally planar front illumination surface, a back portion having a plurality of beveled redirecting facets spaced apart by intermediate areas, and a plurality of optics elements disposed within the intermediate areas. A first light source is coupled at the wide end to transmitted light longitudinally through the body portion toward the redirecting facets. The redirecting facets having reflective surfaces transverse to the planar front illumination surface to reflect and scatter the light toward the front surface in a relatively low intensity light distribution. A second light source is coupled adjacent the back portion behind the intermediate areas. The optics elements transmit the light directly through the intermediate areas toward the front surface in a relative high intensity light distribution. The optics elements may also include concave, convex and/or facet for shaping the direct light toward the front illumination surface.

20 Claims, 4 Drawing Sheets

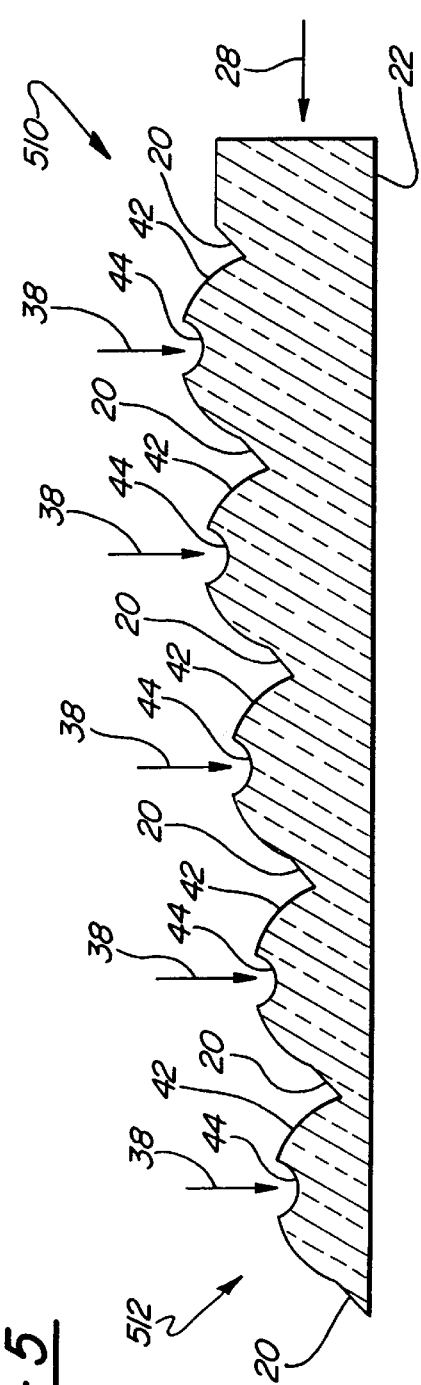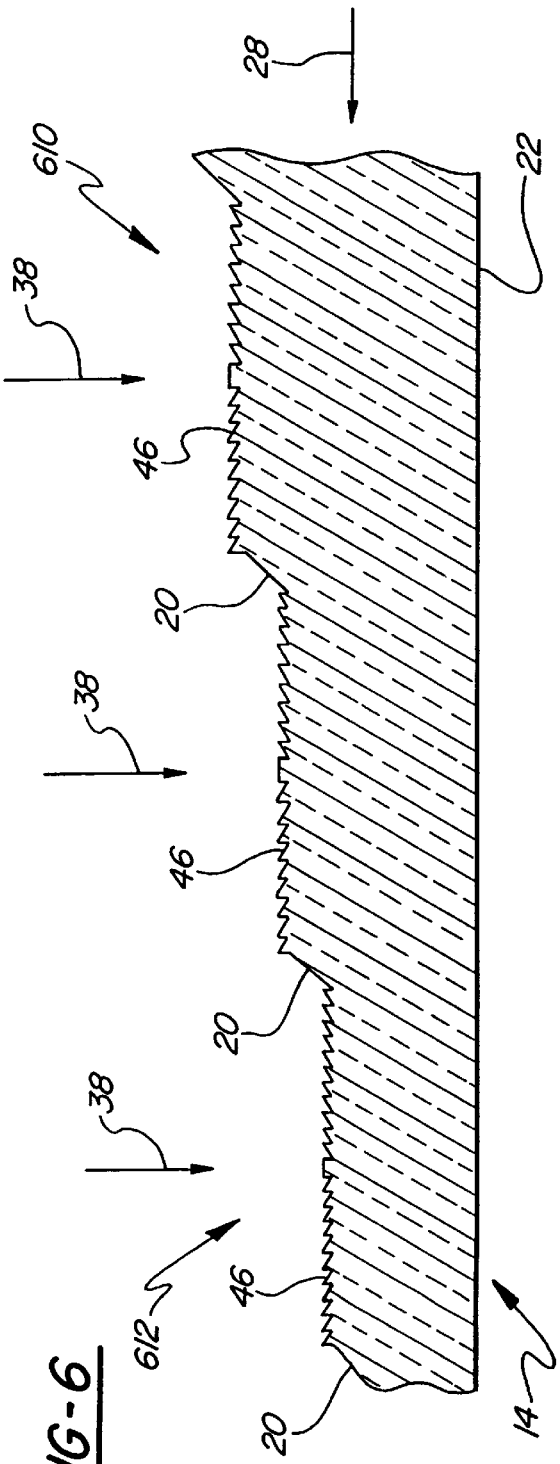

OPTICS FOR SEPARATION OF HIGH AND LOW INTENSITY LIGHT

This application claims the benefit of U.S. Provisional No. 60/060,717 filed Sep. 19, 1997.

FIELD OF INVENTION

The subject invention relates to a separation optics structure for separating and distributing high and low intensity light to an illumination surface.

BACKGROUND OF THE INVENTION

Conventional light managing systems for automotive vehicle headlights, sidelights and taillights typically include a bulb filament recessed in a reflector housing behind a cover lens. The light emitted from the bulb filament is reflected from the reflector housing outwardly through the cover lens to form a beam or planar light image. The cover lens shapes the light into the desired pattern, i.e., focused headlight beam or patterned side or rear signal. However, conventional bulb and reflector lighting systems are disadvantageous in terms of styling and size flexibility. The bulb and reflector require a significant depth and width to acquire desired focus and light dispersion through the cover lens, thus, limiting the ability to streamline and contour the light system.

Other systems have been developed to provide alternatives to the conventional bulb filament and reflector system utilizing a light pipe and collimator to direct the light to a reflective emitter having a plurality of lens facets to redirect the light in the desired path and pattern. These systems are exemplified in U.S. Pat. Nos. 5,434,754 to Li et al., issued Jul. 18, 1995 and 5,197,792 to Jiao et al., issued Mar. 30, 1993.

However, these alternatives are deficient at separating high and low light intensities through the lens.

SUMMARY OF THE INVENTION

The subject invention is a separation optics structure comprising a transparent unitary body portion extending between first and second ends. The body portion has a front portion defining a front illumination surface, a back portion including a plurality of beveled redirecting facets separated by intermediate areas, and an optics element disposed within at least one of the intermediate areas. The facets direct and scatter light received from one of the first and second ends toward the front illumination surface and the optics element transmits light received from the intermediate area directly toward the front illumination surface.

The facets redirect the light through the body portion toward the front illumination surface causing low intensity light distribution while the optics element transmits light directing into the front illumination surface causing high intensity light distribution.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a cross-sectional view of an embodiment of a separation optics structure, including a series of beveled redirecting facets and a plurality of intermediate directly transmitting combination convex-concave portions: and FIG. 6 is a cross sectional view of an embodiment of a separation optics structure, including a series of beveled redirecting facets and a plurality of intermediate directly transmitting Fresnel portions.

DETAILED DESCRIPTION OF THE INVENTION

Figure 1:
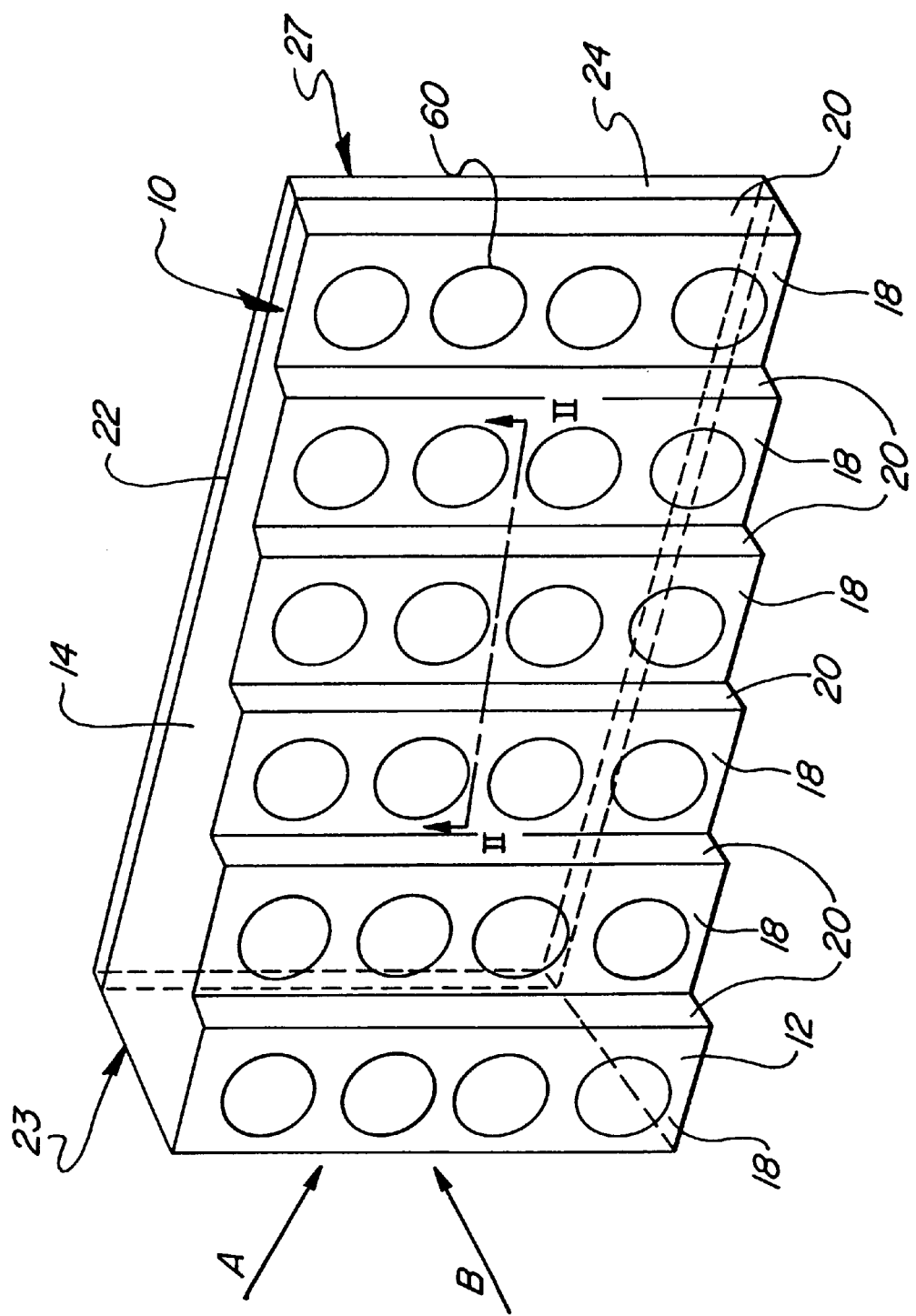
FIG. 1 is a rear perspective view of a separation optics structure according to principles of the present invention.

Referring now to the drawings, there is illustrated in FIG. 1 a separation optics structure, generally indicated at 10, embodying principles of the present invention. Separation optics structure 10 comprises a transparent unitary body portion extending between a first wide end 23 and a second distal end 27. The body portion includes a back portion 12 having a plurality of redirecting facets 20 and intermediate areas 18 formed thereon and a front portion 14 having a front illumination surface 22. The optics structure 10 separates light emitted from orthogonally directed light sources, represented schematically by arrows "A" and "B", into relatively low intensity light reflected off the redirecting facets 20 and through the front surface 22 and relatively high intensity light transmitted directly through front surface 22 of structure 10 at intermediate areas 18.

The separation optics structure 10 is preferably injection molded of a transparent plastic. The overall height, length, and thickness of the separation optics structure are variable depending on lighting design requirements and/or lighting system packaging restrictions.

As shown more particularly in FIG. 1, the back portion 12 of optics structure 10 includes a plurality of beveled redirecting facets 20 with intermediate areas 18 disposed between adjacent facets 20. The front portion 14 includes a front illumination surface 22 that is preferably planar and may also include a lens cover 24 fitted directly over the front surface 22. Extending from left to right in FIG. 1, the thickness of the optics structure 10 defined between front surface 22 and back portion 12 becomes progressively less in size. That is, the intermediate areas 18 extend from a leading edge of one facet 20 to a trailing edge of an adjacent facet 20 to define a wedge-shaped body portion extending longitudinally from the first wide end 23 to the second distal end 27.

Figure 2:
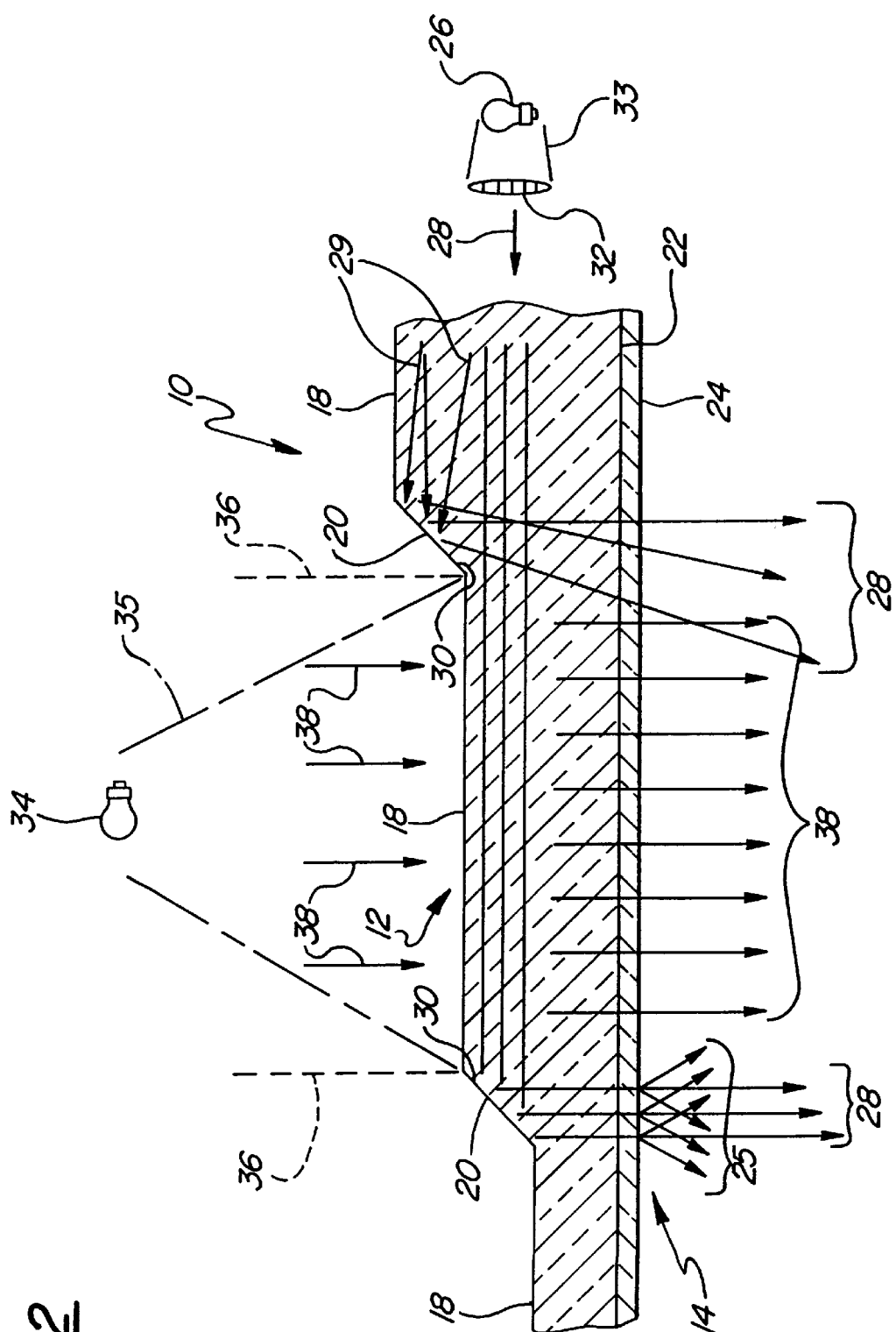
FIG. 2 is a partial cross-sectional view of a separation optics structure according to the principles of the present invention viewed in the direction "II—II? in FIG. 1 with orthogonal light sources shown.

The basic operation of the separation optics structure 10 is illustrated in FIG. 2. A light source 26, such as a light emitting diode ("LED") or other conventional light source, is coupled at the wide end of the separation optics structure 10 so that light 28 emitted from source 26 is transmitted substantially longitudinally through optics structure 10 toward the redirecting facets 20. The transmitted light passes longitudinally through the optics structure 10 essentially unobstructed until contacting a redirecting facet 20. The redirecting facets 20 define reflective interior surfaces 30 for light incident thereon so that longitudinally transmitted light 28 which encounters a redirecting facet 20 is reflected away from the reflective surface 30 and is redirected transversely towards and through the front illumination surface 22 of the separation optics structure 10.

Thus, light 28 emitted by edge-mounted source 26 is redirected by the plurality of facets 20 and is emitted from front surface 22 of optics structure 10 over a relatively large area thereof. Because the light 28 is scattered by the plurality of facets 20,. the resulting light emitted from front surface 22 effects a relatively low intensity light distribution.

Reflective surfaces 30 of redirecting facets 20 preferably reflect incident light by total internal reflection. Alternatively, or, in addition, redirecting facets 20 may be coated with a reflective coating, such as a vacuum deposited aluminum coating, to enhance the reflective properties of the facet.

The redirecting facets 20 shown in FIGS. 1 and 2 comprise continuous, uniformly spaced, parallel facets of uniform size and angular orientation extending continuously from top to bottom across the back portion 12 of separation optics structure 10. Redirecting facets may, however, be of varying sizes and angular orientations, may not be mutually parallel or uniformly spaced, or may not extend continuously across the rear portion of the optics structure. Some facets may be coated with a reflecting coating and some may not. The size, spacing, orientation, etc., of the facets may be varied to tailor the separation optics structure to most efficiently accomplish desired lighting objectives.

Light source 26 may be coupled with the edge of the separation optics structure 10 by means of coupling optics 32, such as a collimating Fresnel lens element and/or a light-gathering reflective cone, shown schematically at 33, so as to condition light directed into the separation optics structure 10.

Another light source 34 may be positioned behind the intermediate area 18 of separation optics structure 10. Intermediate area 18, as defined between dashed lines 36, represents the available surface area for transmission optics, such as optics elements 60 shown in FIG. 1. It can be appreciated that additional light sources may be set behind a multiplicity of intermediate areas 18 or that more than one light source may be positioned between two adjacent redirecting facets 20.

Light 38 emitted by the light source 34 is transmitted directly through the intermediate area 18 of the separation optics structure 10. Optical treatments, such as a reflective cone schematically represented at 35 for gathering and focusing light, may be used in conjunction with source 34.

Because relatively little light scattering occurs in the intermediate area 18, light 38 transmitted through intermediate area 18 effects relatively bright, high intensity illuminated regions as viewed across the front surface 22 of the optics structure 10. These high intensity regions can be oriented and arranged to create desired surface light patterns, such as designs, logos, text for signs, or stop and/or turn signals for automobile signal lamps.

As noted, a cover member 24 may be disposed over front surface 22. Cover member 24 may comprise a colored translucent lens for effecting a colored light output from the optics structure 10. Lens cover 24 may also include diffusive elements to further scatter the light transmitted through front surface 22, as shown at 25, thus providing a large effective illuminated area.

The optics elements 60 on the intermediate areas 18 can be configured in various different ways or in various combinations in order to produce the desired high intensity effects. More specifically, and as shown in FIGS. 3–6, the intermediate areas 18, as part of the separation optics structure 10, may be concave, convex, Fresnel or holographic optics, or any combination thereof. The type of optical treatment provided in the intermediate areas affects the specific transmission of high intensity light 38 through the intermediate areas 18 of the optics structure 10, thereby making possible a variety of viewable patterns.

Figure 3:
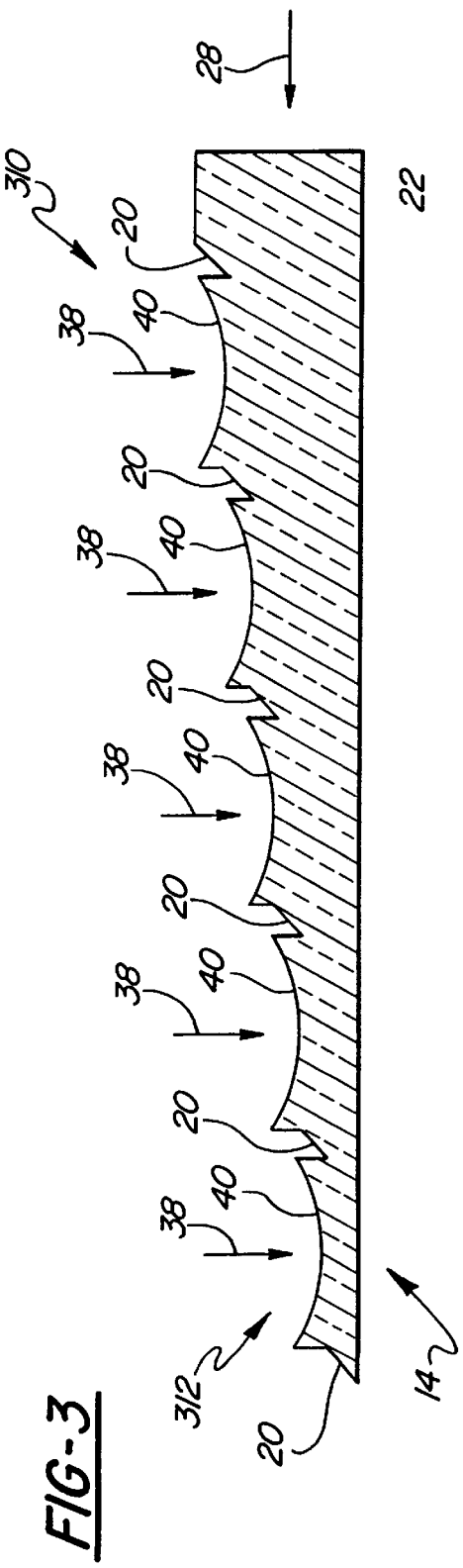
FIG. 3 is a cross-sectional view of an embodiment of a separation optics structure, including a series of beveled redirecting facets and a plurality of intermediate directly transmitting concave portions.

As shown in FIG. 3, the back portion 312 of separation optics structure 310 includes a series of concave surfaces 40 disposed between adjacent beveled redirecting facets 20. Concave surfaces 40 will cause light transmitted there through to spread as it is transmitted.

The concave surfaces 40 may comprise discreet circular concave lens elements, or may comprise an elongated arcuate surface representing a sector of a cylindrical surface. In addition, the radius of curvature of surface 40 may be tailored to meet light output distribution and intensity requirements.

Figure 4:
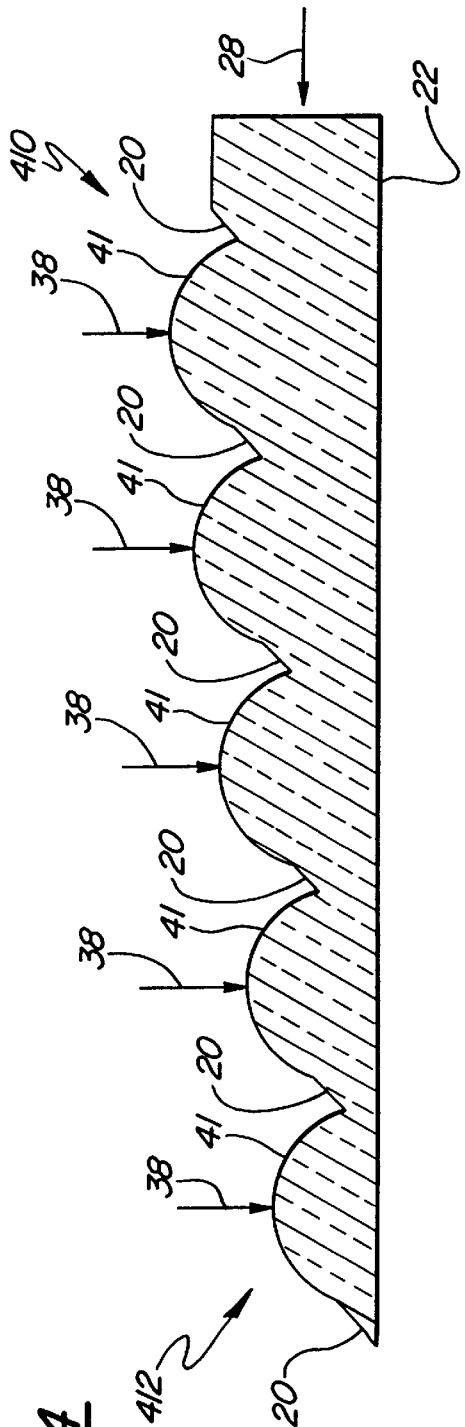
FIG. 4 is a cross-sectional view of an embodiment of a separation optics structure, including a series of beveled redirecting facets and a plurality of intermediate directly transmitting convex portions.

As shown in FIG. 4, the back portion 412 of separation optics structure 410 may comprise a plurality of convex surfaces 41 disposed between adjacent redirecting facets 20. Convex surface 41 will cause light transmitted there through to focus as it is transmitted.

Again, the convex surface 41 may comprise discreet circular convex lens elements or may comprise an elongated arcuate surface representing a sector of a cylindrical surface. In addition, the radius of curvature of surface 41 may be tailored to meet light output distribution and intensity requirements.

As shown in FIG. 5, the back portion 512 of separation optics structure 510 may comprise a plurality of direct transmitting optics surfaces defined by combinations of convex surfaces 42 and concave surfaces 44 disposed between adjacent redirecting facets 20. In the embodiment shown in FIG. 5, concave surfaces 44 are centrally disposed within convex surfaces 42, and each concave surface 44 has a smaller radius of curvature than the convex surface 42 in which it is superimposed.

The concave and convex surfaces may, if the desired illumination pattern requires it, be interchanged. That is, a convex surface of relatively small radius of curvature can be disposed within a concave surface of larger radius of curvature. In addition, two or more concave surfaces 44 may be combined with the single convex surface 42 (or two or more cohe concave surface 44 scatters light transmitted through it, and the convex surface 42 focuses light transmitted through it.

Concave surface 44 and convex surface 42 may comprise discreet circular lens elements or may comprise elongated arcuate surfaces representing sectors of cylindrical surfaces.

As shown in FIG. 6, the back portion 612 of separation optics structure 610 may comprise a plurality of directly transmitting Fresnel surfaces 46 disposed between adjacent redirecting facets 20. Each Fresnel surface 46 comprises a plurality of facets which may be revolved around a common axis, i.e., the optical axis of the surface, or may comprise parallel linear facets extending through the intermediate area between redirecting facets 20.

The invention has been described in an illustrative manner, and it is to be understood that the terminology which has been used is intended to be in the nature of words of description rather than of limitation.

It is now apparent to those skilled in the art that many modifications and variations of the present invention are possible in light of the above teachings. It is therefore, to be understood that within the scope of the appended claims the invention may be practiced otherwise than as specifically described.

What is claimed is:

1. A separation optics structure comprising:
   a transparent unitary body portion extending between first and second ends, said body portion having a front portion defining a front illumination surface,
   a back portion including a plurality of beveled redirecting facets separated by intermediate areas, said facets redirect and scatter light received from one of said first and second ends toward said front illumination surface, and
   an optics element disposed within at least one of said intermediate areas, said optics element having any one of a projection and depression, said optics element directing light received from said intermediate area directly towards said front illumination surface.

2. A separation optics structure as set forth in claim 1 further including a plurality of optics elements disposed on each of said intermediate areas for directing light to said front illumination surface.

3. A separation optics structure as set forth in claim 2 wherein said front illumination surface is generally planar, said intermediate areas spaced generally parallel to said planar front illumination surface and said redirecting facets spaced apart by said intermediate areas, said redirecting facets having a reflective surface generally transverse to said front surface and said intermediate areas.

4. A separation optics structure as set forth in claim 3 wherein said intermediate areas of said transparent unitary body portion extend from a leading edge of one of said facets to a trailing edge of said adjacent facet defining a wedge-shaped transparent unitary body portion extending longitudinally from a first wide end to a second distal end.

5. A separation optics structure as set forth in claim 4 wherein said front illumination surface includes a cover lens for shaping the light directed from said facets and said optics elements into a predetermined pattern.

6. A separation optics structure as set forth in claim 4 wherein said redirecting facets include a vacuum deposited aluminum coating.

7. A separation optics structure as set forth in claim 4 wherein said optics elements each include said depression in the configuration of a concave surface extending between said adjacent redirecting facets.

8. A separation optics structure as set forth in claim 4 wherein said optics elements each include said projection in the configuration of a convex surface extending between said adjacent redirecting facets.

9. A separation optics structure as set forth in claim 4 wherein said optics elements each include said projection and depression in the configuration of a convex surface portion and a concave surface portion respectfully, extending between said adjacent redirecting facets.

10. A separation optics structure as set forth in claim 4 wherein said optics elements each include said projection and depression in the configuration of a plurality of facets disposed transverse to said planar front illumination surface between said adjacent redirecting facets.

11. A separation optics structure comprising:
    a transparent unitary body portion extending between first and second ends, said body portion having a front portion defining a front illumination surface,
    a back portion including a plurality of beveled redirecting facets separated by intermediate areas, said facets redirect and scatter light received from one of said first and second ends toward said front illumination surface,
    a back light source disposed behind said intermediate area, and
    an optics element disposed within at least one of said intermediate areas, said optics element directing light received from said back light source directly towards said front illumination surface.

12. A separation optics structure as set forth in claim 11 further including a plurality of optics elements disposed on each of said intermediate areas for directing light to said front illumination surface.

13. A separation optics structure as set forth in claim 12 wherein said front illumination surface is generally planar, said intermediate areas spaced generally parallel to said planar front illumination surface and said redirecting facets spaced apart by said intermediate areas, and said redirecting facets having a reflective surface generally transverse to said front surface and said intermediate areas.

14. A separation optics structure as set forth in claim 13 wherein said intermediate areas of said transparent unitary body portion extend from a leading edge of one of said facets to a trailing edge of said adjacent facet defining a wedge-shaped transparent unitary body portion extending longitudinally from a first wide end to a second distal end.

15. A separation optics structure as set forth in claim 14 wherein said redirecting facets include a vacuum deposited aluminum coating.

16. A separation optic structure as set forth in claim 14 wherein said optics element has any one of a projection and depression.

17. A separation optics structure as set forth in claim 16 wherein said optics elements each include said depression in the configuration of a concave surface extending between said adjacent redirecting facets.

18. A separation optics structure as set forth in claim 16 wherein said optics elements each include said projection in the configuration of a convex surface extending between said adjacent redirecting facets.

19. A separation optics structure as set forth in claim 16 wherein said optics elements each include said projection and depression in the configuration of a convex surface portion and a concave surface portion, respectfully, extending between said adjacent redirecting facets.

20. A separation optics structure as set forth in claim 16 wherein said optics elements each include said projection and depression in the configuration of a plurality of facets disposed transverse to said planar front illumination surface between said adjacent redirecting facets.

* * * * *